(12) United States Patent
Fahrenbruck et al.

(10) Patent No.: US 9,217,609 B2
(45) Date of Patent: Dec. 22, 2015

(54) APPARATUS AND METHODS FOR CONVERSION OF SILICON TETRACHLORIDE TO TRICHLOROSILANE

(75) Inventors: Scott Fahrenbruck, Missoula, MT (US); Bruce Hazeltine, Missoula, MT (US); Andrew Schweyen, Missoula, MT (US); Shawn Skinner, Missoula, MT (US)

(73) Assignee: GTAT CORPORATION, Merrimack, NH (US)

( * ) Notice: Subject to any disclaimer, the term of this patent is extended or adjusted under 35 U.S.C. 154(b) by 1075 days.

(21) Appl. No.: 13/246,176

(22) Filed: Sep. 27, 2011

(65) Prior Publication Data

US 2012/0328503 A1    Dec. 27, 2012

Related U.S. Application Data

(60) Provisional application No. 61/499,451, filed on Jun. 21, 2011, provisional application No. 61/499,461, filed on Jun. 21, 2011.

(51) Int. Cl.
*B01J 12/00* (2006.01)
*B01J 19/24* (2006.01)
*C01B 33/107* (2006.01)
(Continued)

(52) U.S. Cl.
CPC . *F28F 7/02* (2013.01); *B01J 12/00* (2013.01); *B01J 12/005* (2013.01); *B01J 19/0013* (2013.01); *B01J 19/0053* (2013.01); *B01J 19/24* (2013.01); *C01B 33/1071* (2013.01); *B01J 2219/0002* (2013.01); *B01J 2219/00085* (2013.01); *B01J 2219/00094* (2013.01); *B01J 2219/00103* (2013.01); *B01J 2219/00135* (2013.01); *B01J 2219/00159* (2013.01)

(58) Field of Classification Search
USPC .................................. 422/203, 199; 423/342
See application file for complete search history.

(56) References Cited

U.S. PATENT DOCUMENTS 1,068,763 A * 7/1913 Hadaway, Jr. ................. 338/256
1,071,844 A * 9/1913 Wiegand ....................... 338/291
(Continued)

FOREIGN PATENT DOCUMENTS

EP        80013 A1 * 6/1983
EP     1454670 B1    9/2004
(Continued)

OTHER PUBLICATIONS

PCT Search Report dated Jun. 13, 2014 of Patent Application No. PCT/US11/053477 filed Sep. 27, 2011.
(Continued)

*Primary Examiner* — Jennifer A Leung
(74) *Attorney, Agent, or Firm* — Maine Cernota & Rardin

(57) ABSTRACT

The invention relates to apparatus and associated methods for conversion of silicon tetrachloride (STC) to trichlorosilane (TCS). The converter features a relatively thin annular heating zone surrounding a reaction chamber. Within the annular heating zone is a heating element that has an annular conformation about the reaction chamber. The design allows high convective heat transfer, which facilitates the use of lower heating element surface temperatures, prolonging the life of the equipment, reducing capital cost by allowing use of a smaller reactor, and greatly improving heating efficiency. A heat exchanger with a plurality of heat exchanger blocks provides further efficiency.

20 Claims, 13 Drawing Sheets

(51) Int. Cl.
*F28F 7/02* (2006.01)
*B01J 19/00* (2006.01)

(56) References Cited

U.S. PATENT DOCUMENTS

| | | | |
|---|---|---|---|
| 1,686,371 A * | 10/1928 | Fauser | 422/148 |
| 2,821,369 A † | 1/1958 | Hilliard | |
| 3,250,322 A * | 5/1966 | McCrary, Jr. et al. | 165/133 |
| 3,391,016 A * | 7/1968 | McCrary, Jr. et al. | 427/249.15 |
| 3,406,044 A * | 10/1968 | Harris | 428/408 |
| 3,933,985 A | 1/1976 | Rodgers | |
| 4,165,363 A | 8/1979 | Weigert | |
| 4,526,769 A | 7/1985 | Ingle | |
| 4,536,642 A | 8/1985 | Hamster et al. | |
| 5,126,112 A | 6/1992 | Burgie | |
| 5,422,088 A | 6/1995 | Burgie et al. | |
| 5,906,799 A | 5/1999 | Burgie et al. | |
| 7,442,824 B2 | 10/2008 | Paetzold et al. | |
| 7,964,155 B2 | 6/2011 | Ishii et al. | |
| 2004/0173597 A1 | 9/2004 | Agrawal et al. | |
| 2007/0073075 A1 | 3/2007 | Paetzold et al. | |
| 2009/0324477 A1 | 12/2009 | Mizushima et al. | |
| 2010/0008842 A1 | 1/2010 | Pfluegler et al. | |
| 2012/0076714 A1 | 3/2012 | Fahrenbruck et al. | |
| 2014/0334992 A1 * | 11/2014 | Hazeltine | 422/206 |

FOREIGN PATENT DOCUMENTS

| | | |
|---|---|---|
| EP | 2000434 A2 | 12/2008 |
| EP | 2085359 A1 | 8/2009 |
| GB | 231090 A * | 3/1925 |
| JP | H07232910 A | 9/1995 |
| JP | 2007-091587 | 4/2007 |
| WO | WO-2010113298 A1 | 10/2010 |
| WO | WO-2010116440 A1 | 10/2010 |

OTHER PUBLICATIONS

Schunk, "Preserving Our Future with Solar Energy Today," Innovative Insulation Materials, 4 pages.
Partial International Search Report for PCT/US11/053477 dated Feb. 15, 2012, (2 pages).
International Search Report and Written Opinion of the International Searching Authority for PCT/US11/053479 dated Mar. 26, 2012 (18 pages).
Taiwan Search Report mailed on Feb. 16, 2015 for Taiwan Application No. 100134881, filed on Sep. 27, 2011, 1 page.
Office Action for Taiwan Application No. 100134881, mailed on Feb. 26, 2015, 9 pages.
Office Action for U.S. Appl. No. 13/246,180 mailed on Jan. 15, 2015, 14 pages.
Office Action for Japanese Application 2014-516961 mailed on Mar. 24, 2015, 3 pages.

* cited by examiner
† cited by third party

APPARATUS AND METHODS FOR CONVERSION OF SILICON TETRACHLORIDE TO TRICHLOROSILANE

CROSS-REFERENCE TO RELATED APPLICATIONS

This patent application claims the benefit of U.S. Provisional Patent Application No. 61/499,451 and U.S. Provisional Patent Application No. 61/499,461, both filed on Jun. 21, 2011, the disclosures of which are hereby incorporated by reference herein in their entireties.

FIELD OF THE INVENTION

This invention relates generally to apparatus and methods for hydrogenation of a chlorosilane. More particularly, in certain embodiments, the invention relates to apparatus and methods for conversion of silicon tetrachloride (STC) to trichlorosilane (TCS).

BACKGROUND OF THE INVENTION

Chemical vapor deposition (CVD) reactors are used to produce polycrystalline silicon (polysilicon), the key raw material used in silicon-based solar wafers and cells. Polysilicon is also used to make semiconductor wafers for microelectronic applications. The most widely used method for producing polysilicon is the Siemens reactor process, which has been in existence for about fifty years. In this process, high temperature polysilicon rods are placed in a reactor, and trichlorosilane (TCS) gas is passed over these rods. The silicon in the gas is deposited on the rods, and when the rods are grown large enough, they are removed from the reactor. The end product is in the form of polysilicon rods or chunks, which can be further processed into ingots, then sliced into wafers that are made into solar cells, for example.

The CVD-based Siemens process for manufacturing polysilicon produces a large amount of the byproduct silicon tetrachloride (STC). For example, a maximum of about 20 kg of STC is made as a byproduct for every kg of polysilicon produced. It is possible, however, to convert STC back to TCS by reacting STC with hydrogen in the gas phase at high temperature. The product TCS can then be recycled to the CVD reactor for production of more polysilicon. If STC could not be recycled, there would be a huge loss of the primary raw material TCS and a cost for disposal of the byproduct STC.

To efficiently react STC with hydrogen to form TCS, high reactant gas temperatures (e.g., greater than 900° C.) are required. Current commercial systems for conversion of STC to TCS use retrofitted Siemens CVD reactors with electrically heated graphite rods to heat the reactant gases. This equipment has a number of problems. For example, because CVD reactors have a high volume to heated rod surface area ratio, the local velocities and the heat transfer coefficients in the reactor are low. Thus, very high rod surface temperatures are required (e.g., temperatures greater than 1400° C.) to heat the reactant gas to sufficient temperature. Furthermore, the retrofitted CVD reactors have a large, heavy baseplate, which is expensive and makes it inconvenient to add heat exchanger equipment for recovery of heat.

Moreover, the heated graphite rods in a retrofitted CVD reactor require a large number of electrical connections. For example, the reactor may require two to four electrical connections per hairpin, which are all a potential source of rod failure and erroneous ground faults.

Furthermore, CVD reactors have a high radiation heat loss to the shell, wasting large amounts of energy. Current retrofitted CVD reactors use insulation to reduce the heat loss to the walls, and feature a primitive heat exchanger for heat recovery. The insulation is expensive because it must be made of materials that do not react in a high temperature environment, and it must fit around the outside of the heating rods. Cheaper insulating materials do not exhibit an adequate lifetime due to reaction with reactant gases at the high temperatures involved. The insulation itself will heat nearly to the temperature of the heating rods. With the use of insulation and a primitive heat exchanger, a retrofitted CVD reactor for conversion of STC to TCS requires energy of at least 1.5 KWhr per kilogram of TCS manufactured, which is quite high. Also, various key components of the converter have limited lifetimes and must be replaced at regular intervals—including the heating elements, the electrical connections, the insulation, and components of the heat exchanger.

Purpose-built (non-retrofitted) systems for conversion of STC to TCS have been proposed, which promise to be more energy efficient and cheaper to build than retrofitted CVD reactors. However, such purpose-built systems are not widely used, and are not yet commercially available. U.S. Pat. No. 7,442,824 describes a purpose-built STC to TCS converter with heating elements and a reactor wall that are coated with silicon carbide (SiC) to prevent contamination and degradation of these components in high temperature reaction environments. The converter employs graphite heating rods, as used in retrofitted CVD reactors.

Thus, there is a need for a more efficient STC to TCS converter suitable for commercial use.

SUMMARY OF THE INVENTION

In one aspect, the invention relates to an apparatus for hydrogenation of a chlorosilane. The apparatus includes (i) a heat exchanger configured to exchange heat between a reactant gas and a product gas, wherein the reactant gas includes hydrogen and a chlorosilane; (ii) an annular heating zone configured to receive the reactant gas from the heat exchanger, the heating zone including a heating element configured for direct contact with the reactant gas to produce a heated reactant gas via convective heat transfer; and (iii) a reaction chamber configured to convert the heated reactant gas into the product gas, wherein the heating element has an annular conformation about the reaction chamber.

In another aspect, the invention relates to a method for hydrogenation of a chlorosilane. The method includes the steps of: (i) introducing a reactant gas into a converter including a heat exchanger, a substantially annular heating zone, a heating element, and a reaction chamber, wherein the reactant gas includes hydrogen and a chlorosilane; (ii) directing the reactant gas through the heat exchanger to exchange heat between the reactant gas and a product gas, thereby preheating the reactant gas; (iii) directing the preheated reactant gas from the heat exchanger into the substantially annular heating zone including the heating element, wherein the preheated reactant gas comes into direct contact with a surface of the heating element; (iv) directing the heated reactant gas from the substantially annular heating zone into the reaction chamber, wherein the heating element has an annular conformation about the reaction chamber; and (v) converting the heated reactant gas into the product gas within the reaction chamber.

In another aspect, the invention relates to a heating element for use in a converter for hydrogenation of a chlorosilane. The heating element includes a tube having slots defining a serpentine electrical path, wherein the slots include a plurality of axial slots, and, for at least one of the axial slots, a stiffening element disposed within the axial slot.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
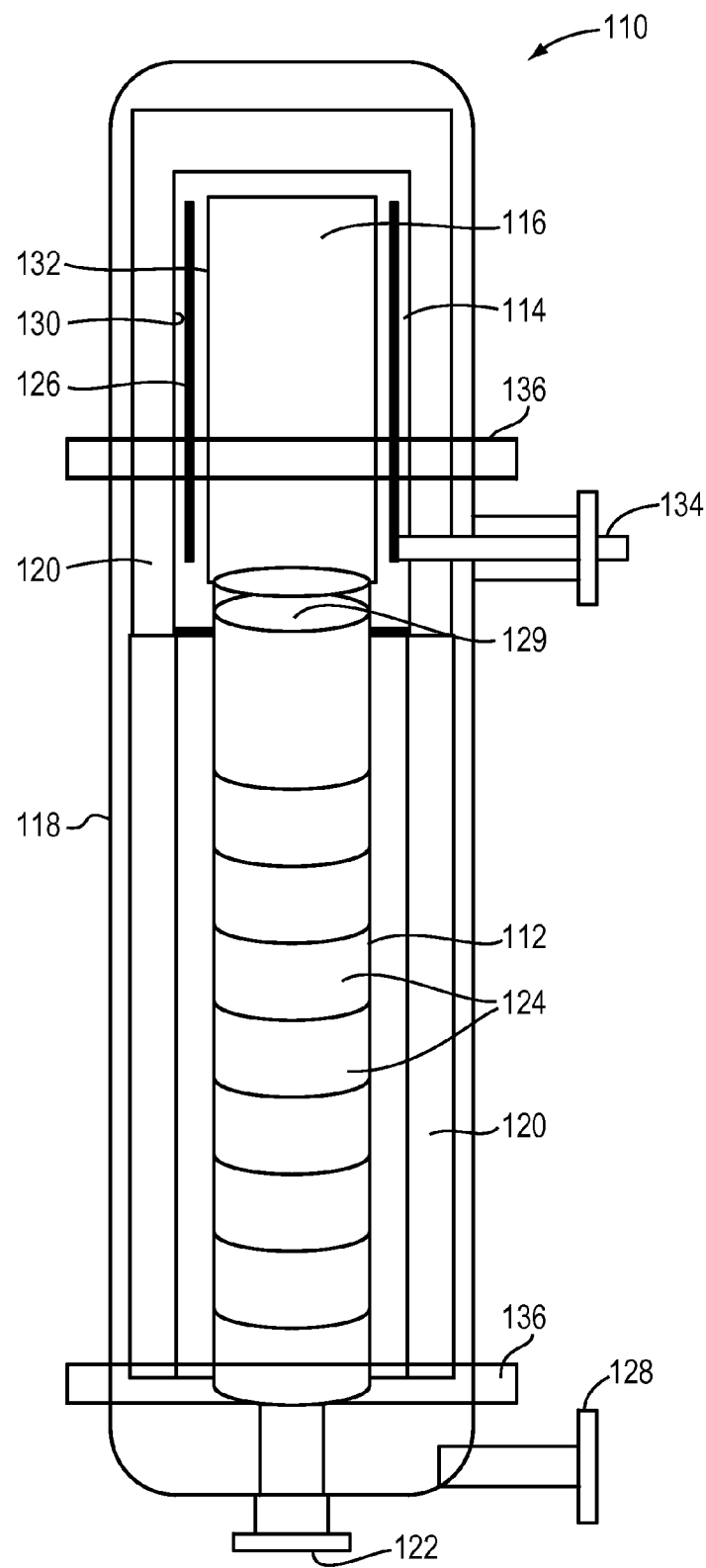
FIG. 1 is a schematic front view of a converter, according to an illustrative embodiment of the invention.

Throughout the description, where apparatus, compositions, mixtures, and composites are described as having, including, or comprising specific components, or where processes and methods are described as having, including, or comprising specific steps, it is contemplated that, additionally, there are compositions, mixtures, and composites of the present invention that consist essentially of, or consist of, the recited components, and that there are processes and methods of the present invention that consist essentially of, or consist of, the recited processing steps.

It should be understood that the order of steps or order for performing certain actions is immaterial so long as the invention remains operable. Moreover, two or more steps or actions may be conducted simultaneously.

It is contemplated that methods, systems, and processes of the claimed invention encompass scale-ups, variations, and adaptations developed using information from the embodiments described herein. Methods and processes described herein may be conducted in batch, semi-continuous, and/or continuous operation. Reactors may be single-stage or multi-stage. It is contemplated that methods of the invention may be combined or supplemented with reactors, systems, or processes that are known in the art. Known, suitable techniques for material separation, isolation, and purification of reaction products may be adapted for application in various embodiments of the claimed invention.

The mention herein of any publication, for example, in the Background section, is not an admission that the publication serves as prior art with respect to any of the claims presented herein. The Background section is presented for purposes of clarity and is not meant as a description of prior art with respect to any claim.

As used herein, a "chlorosilane" is understood to be a compound of the general formula $R_nSiCl_{4-n}$, where the radicals R are identical or different and are each hydrogen or an organic radical, such as an alkyl group $C_nH_{2n+1}$, and n is 0, 1, 2 or 3. For example, in one embodiment the radicals R are —H, —CH$_3$, or a combination thereof. In certain embodiments, each R is —H. In certain embodiments, the integer n is 0, 1 or 2. In certain embodiments, n is 0. In preferred embodiments, the chlorosilane is tetrachlorosilane (silicon tetrachloride, STC). In other embodiments, the chlorosilane is a chlorodisilane or methyltrichlorosilane.

As used herein, "annular" is understood to mean ring-shaped, at least in cross-section. For example, a three-dimensional heating zone between two concentric, cylindrical surfaces is annular because the cross-section of the heating zone is ring-shaped.

As used herein, an object that has an "annular conformation" is understood to mean an object that has, or whose cross-section has, an annular shape or form. For example, a three-dimensional tube has an annular conformation because its cross-section has an annular, ring-like shape.

As provided herein, a newly designed STC to TCS converter addresses the problems of retrofitted CVD reactors and existing purpose-built converters. The new converter features a relatively thin annular heating zone surrounding a reaction chamber. Within the annular heating zone is a heating element that has an annular conformation about the reaction chamber. Reactant gas flows at a high rate through the annular heating zone, maintaining direct contact with the heating element, and then enters the reaction chamber. The reactant gas includes hydrogen and a chlorosilane (e.g., STC), which reacts in the annular heating zone and/or reaction chamber to form a product gas (e.g., TCS).

The converter achieves high heat transfer efficiency through convective heat transfer within the annular heating zone. Reactant gas flows at a high rate (e.g., in certain embodiments, greater than 25 m/s) directly over the surface of the heating element, and then flows into the reaction chamber. In comparison with previous systems, it is possible to maintain the heating element at a lower temperature (e.g., 1100° C. or less versus 1600° C. of previous systems), while still maintaining sufficiently high reactant gas temperatures (e.g., 900° C. or greater), thereby reducing energy loss and damage to system components caused by high operating temperatures.

Efficiency is improved further by use of a cross flow heat exchanger to preheat the reactant gas before it enters the annular heating zone. Hot product gas passes through channels or passageways within the heat exchanger to heat incoming reactant gas. Heat exchanger blocks are used with gas flow path lengths and hole diameters chosen so that the flow of gas through the blocks results in the heat exchanger blocks being compressed together by gas pressure, thereby facilitating sealing of baffles or flanges.

Residence times within the reaction chamber are much lower in the new converter than in CVD retrofitted converters—e.g., 0.3 seconds versus 4 seconds. Thus, the converter may be made smaller while allowing the same production rate, thereby lowering the capital cost of the equipment. Inert coatings, such as SiC coatings, are preferably used on surfaces of the converter that come into contact with hot gas. Because these coatings are expensive, the reduced surface area requiring these coatings results in a significant cost savings.

The elegant design of the heating element within the annular heating zone of the new converter permits the use of significantly fewer electrical connections (e.g., as few as three electrodes versus previous systems with 24-48 electrode penetrations), thereby simplifying the construction and greatly reducing the electrical ground fault problems and problems inherent in electrical connections of retrofitted CVD reactors and previous purpose-built converters. Furthermore, there is no heavy, bulky baseplate used in the new converter, unlike retrofitted CVD reactors.

In one aspect, the invention relates to an apparatus for hydrogenation of a chlorosilane. The apparatus includes (i) a heat exchanger configured to exchange heat between a reactant gas and a product gas, wherein the reactant gas comprises hydrogen and a chlorosilane; (ii) an annular heating zone configured to receive the reactant gas from the heat exchanger, the heating zone comprising a heating element configured for direct contact with the reactant gas to produce a heated reactant gas via convective heat transfer; and (iii) a reaction chamber configured to convert the heated reactant gas into the product gas, wherein the heating element has an annular conformation about the reaction chamber. In one embodiment, the chlorosilane comprises silicon tetrachloride (STC) and the product gas comprises trichlorosilane (TCS).

In certain embodiments, the apparatus includes a vessel housing the heat exchanger, the annular heating zone, and the reaction chamber. In one embodiment, the apparatus includes (i) insulation between the annular heating zone and a wall of the vessel, and/or (ii) insulation between the heat exchanger and the wall of the vessel. The annular heating zone may lie between the insulation and the reaction chamber. In another embodiment, a ratio of a heat transfer area of the heating element to a cross-sectional area available for flow through the annular heating zone is greater than about 50.

In certain embodiments, the heat exchanger includes a plurality of heat exchanger blocks. Each block may be coated with silicon carbide (SiC), zirconium carbide (ZrC), hafnium carbide (HfC), tantalum carbide (TaC), titanium carbide (TiC), niobium carbide (NbC), hafnium oxide ($HfO_2$), silicon oxide ($SiO_2$), zirconium oxide ($ZrO_2$), tantalum oxide ($Ta_2O_5$), yttrium oxide ($Y_2O_3$), titanium oxide ($TiO_2$), and/or aluminum oxide ($Al_2O_3$). In one embodiment, each of the heat exchanger blocks includes a plurality of passageways aligned with a radial direction and a plurality of passageways aligned with an axial direction. In another embodiment, the heat exchanger blocks are configured such that fluid flow through the heat exchanger creates pressure to secure the heat exchanger blocks together.

In certain embodiments, the reaction chamber has a height between about 0.5 meters and about five meters. The reaction chamber may have a diameter between about 0.1 meters and about 1 meter. In one embodiment, the heat exchanger and/or the heating element each include one of a carbon/carbon composite and graphite. The heating element may be configured to be removable. In another embodiment, the heating element includes no more than three electrodes.

In certain embodiments, the heating element includes a plurality of slots (e.g., circumferential slots) defining a serpentine path, and may further include a stiffening element disposed within an axial slot, wherein the stiffening element has an H-shaped cross-section. The stiffening element may include SiN, alumina, quartz, boron nitride, or mixtures thereof.

In another aspect, the invention relates to a heating element for use in a converter for hydrogenation of a chlorosilane. The heating element includes a tube having slots defining a serpentine electrical path, wherein the slots include a plurality of axial slots, and, for at least one of the axial slots, a stiffening element disposed within the axial slot. In one embodiment, the stiffening element includes an H-shaped cross section. In another embodiment, the stiffening element includes silicon nitride (SiN), alumina, quartz, boron nitride, or mixtures thereof. Each of the axial slots may have a length that is less than an axial length of the tube. The tube may include a floating neutral, which may include a continuous ring of tube material.

In certain embodiments, a cross-section of the tube is substantially circular, polygonal, or elliptical. In one embodiment, the plurality of axial slots divide the tube into a plurality of angular sections. For example, the tube may include three axial slots dividing the tube into three angular sections.

In one embodiment, the slots defining the serpentine electrical path further include a plurality of circumferential slots. In another embodiment, the circumferential slots include connected circumferential slots and disconnected circumferential slots, wherein (i) each of the connected circumferential slots are connected to one of the axial slots, and (ii) each of the disconnected circumferential slots are not connected to any of the axial slots. Within each angular section, the connected circumferential slots may be arranged in pairs, with the connected circumferential slots in each pair approaching one another at a midsection of the angular section. The disconnected circumferential slots may be substantially centered within the angular section, thereby forming the serpentine electrical path. In certain embodiments, the connected circumferential slots and disconnected circumferential slots are arranged in an alternating pattern along an axial direction of the tube. For each angular section between two axial slots, two serpentine electrical paths may be defined such that each serpentine path winds back and forth between an axial slot on one side of the angular section and the midsection, as electrical current travels from one axial end of the tube to an opposite axial end.

FIG. 1 is a schematic front view of an STC to TCS converter 110, according to an illustrative embodiment of the invention. The converter 110 includes a heat exchanger 112, an annular heating zone 114, and a reaction chamber 116. The heat exchanger 112, the annular heating zone 114, and the reaction chamber 116 are housed within a pressure vessel 118. To minimize heat losses to the vessel 118, the heat exchanger 112, the annular heating zone 114, and the reaction chamber 116 are preferably surrounded by thermal insulation 120.

During operation of the converter 110, a reactant gas containing hydrogen and STC is heated by the converter 110 and converted into a product gas containing TCS. Specifically, the reactant gas is delivered into the heat exchanger 112 through a converter inlet 122. The reactant gas passes through and is heated by the heat exchanger 112, which includes a plurality of stacked cylindrical blocks 124. Upon exiting the heat exchanger 112, the reactant gas enters the annular heating zone 114 where a heating element 126, having an annular conformation about the reaction chamber 116, heats the reactant gas to a critical temperature. The reactant gas is then directed into the reaction chamber 116 where the hydrogenation reaction occurs to convert the reactant gas into the product gas. After exiting the reaction chamber 116, the product gas passes through the heat exchanger 112 where heat is transferred from the product gas to the reactant gas to cool the product gas and heat the reactant gas. The product gas then exits the converter 110 at a converter outlet 128.

Figure 2:
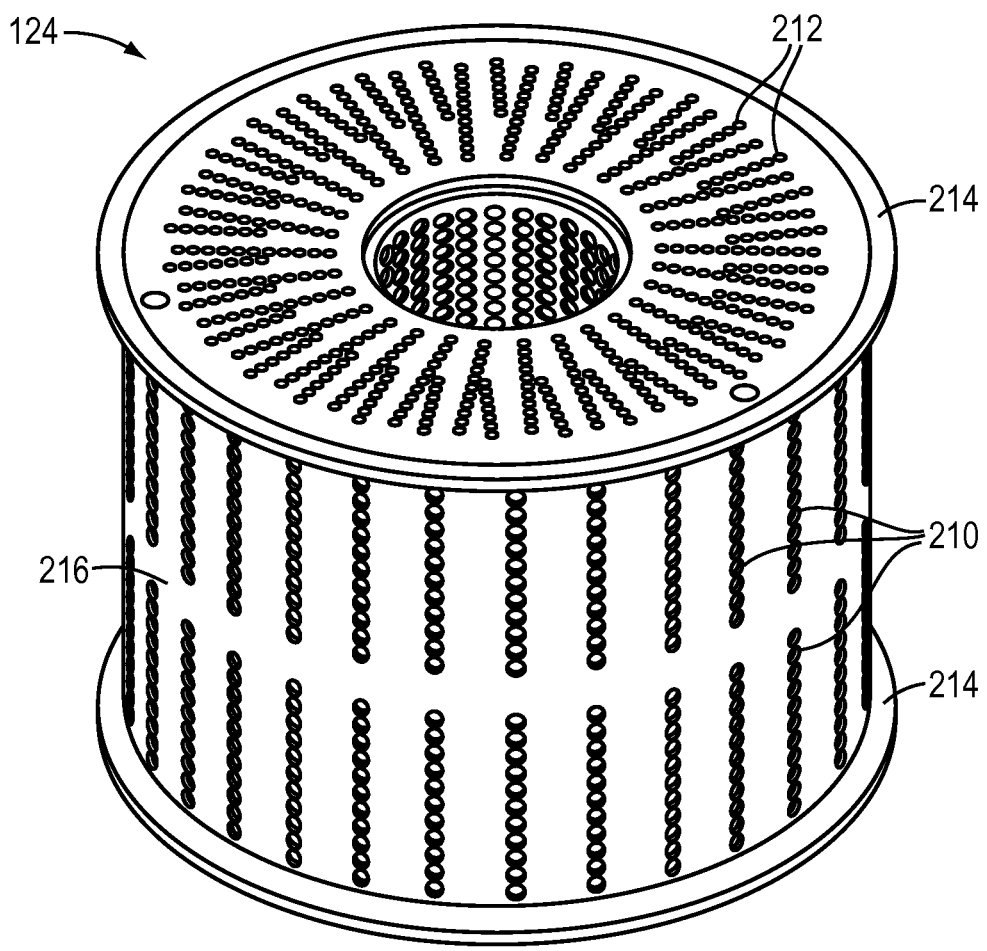
FIG. 2 is a schematic perspective view of a heat exchanger block, according to an illustrative embodiment of the invention.

The heat exchanger 112, the annular heating zone 114, and the reaction chamber 116 will now be described in greater detail. FIG. 2 is a schematic, perspective view of a cylindrical heat exchanger block 124, in accordance with one embodiment of the invention. The heat exchanger block 124 includes radial holes 210 for passage of the reactant gas, and axial holes 212 for passage of the product gas. Top and bottom surfaces of the heat exchanger block 124 include flanges 214. When inserted into a cylindrical chamber within the converter 110, the gasketed flanges 214 prevent gases from flowing from one block 124 to another block 124 along an inner surface of the cylindrical chamber. As depicted, inner and outer edges of the radial holes 210 can be chamfered, which may help minimize a pressure drop within the heat exchanger 112. Due to the radial and axial holes 210, 212, the blocks 124 present a true cross flow design, with the reactant gases flowing radially and the product gases flowing axially. Heat transfer rates are maximized by maintaining high gas velocities within the blocks 124.

Figure 3:
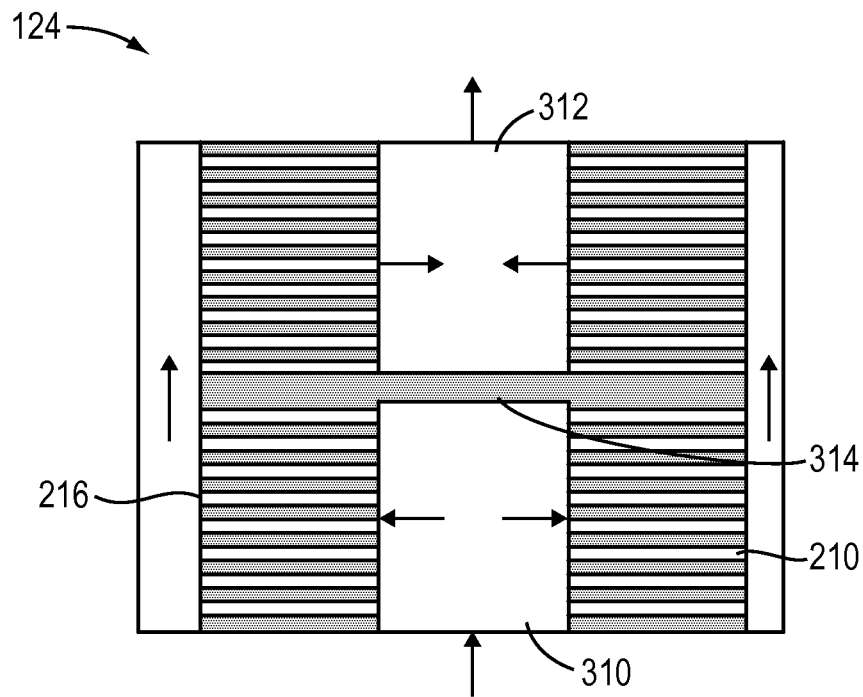
FIG. 3 is a schematic cross-sectional view of passageways for a reactant gas in a heat exchanger block, according to an illustrative embodiment of the invention.
Figure 4:
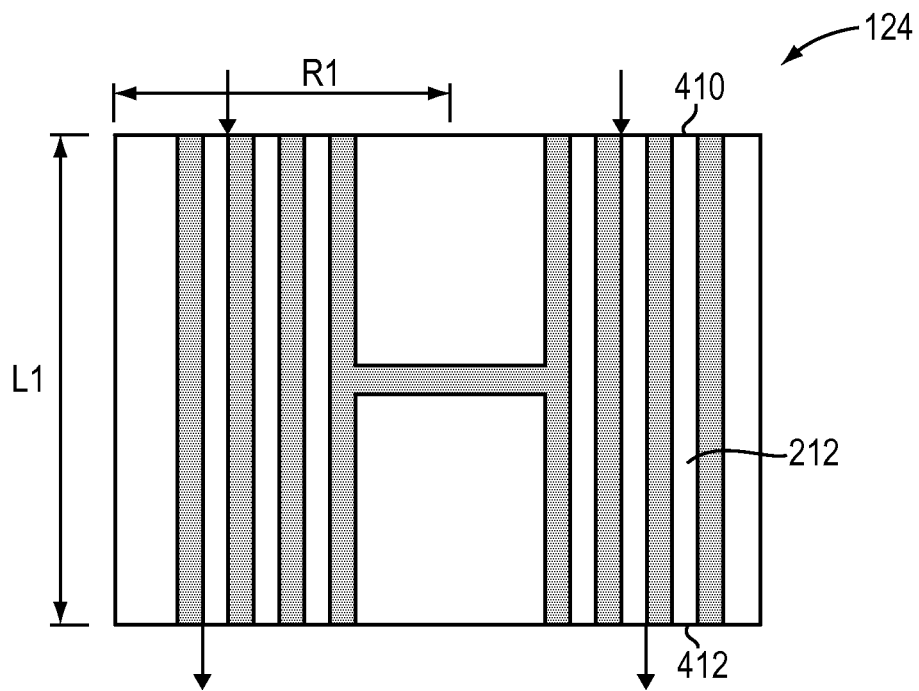
FIG. 4 is a schematic cross-sectional view of passageways for a product gas in a heat exchanger block, according to an illustrative embodiment of the invention.

FIGS. 3 and 4 depict the flow of the reactant gas and the product gas, respectively, through a heat exchanger block 124, in accordance with one embodiment of the invention. Referring to FIG. 3, the reactant gas enters the block 124 through a lower opening 310, and flows radially outward through the radial holes 210. Upon reaching the outer surface 216 of the block 124, the reactant gas flows upward along the outer surface 216 and then radially inward through additional radial holes 210. The reactant gas exits the block 124 through an upper opening 312. A divider 314 prevents the reactant gas from flowing directly through the block 124 from the lower opening 310 to the upper opening 312.

Referring to FIG. 4, the product gas enters the block 124 at a top surface 410 and flows through axial holes 212 to reach a bottom surface 412 of the block 124. When multiple blocks 124 are stacked within the converter 110, the axial holes 212 of adjacent blocks 124 are aligned to facilitate the flow of the product gas through the blocks 124. The heat exchanger 112 typically includes about 10 blocks 124, but more or fewer blocks 124 may be included. In certain embodiments, a radius R1 of the block 124 is between about 0.2 meters and about 0.4 meters. In certain embodiments, an axial length L1 of the block 124 is between about 0.4 meters and about 0.8 meters. In some embodiments, the flow of the reactant and product gases through the blocks 124 creates pressure that forces or secures the blocks 124 together.

The heat exchanger blocks 124 are made of a thermally conductive and stable material and preferably include a coating. In one embodiment, the blocks are made of carbon (e.g., graphite) and/or a carbon/carbon composite. In another embodiment, the coating includes, for example, silicon carbide (SiC), zirconium carbide (ZrC), hafnium carbide (HfC), tantalum carbide (TaC), titanium carbide (TiC), niobium carbide (NbC), hafnium oxide ($HfO_2$), silicon oxide ($SiO_2$), zirconium oxide ($ZrO_2$), tantalum oxide ($Ta_2O_5$), yttrium oxide ($Y_2O_3$), titanium oxide ($TiO_2$), and/or aluminum oxide ($Al_2O_3$). In certain embodiments, the coating is SiC. In one embodiment, the coating covers all surfaces of each block 124, including surfaces that have an operating temperature of less than 700° C. For example, in certain embodiments, the radial and axial holes 210, 212, outer surface 216, and top and bottom surfaces 410, 412 of each block 124 are coated. The coating may prevent chemical attack of the blocks 124 and/or diffusion of gases through the blocks 124. Even at lower temperatures, e.g., below 700° C., diffusion of gas through the blocks may be a problem, and coating the entire heat exchanger block 124 surface with silicon carbide would be expected to remedy this problem.

An approach temperature for the heat exchanger 112 is a temperature difference between the product gas and the reactant gas. Referring again to FIG. 1, as used herein, the "approach temperature" is a temperature difference between the product gas and the reactant gas at a top surface 129 of the heat exchanger 112, where the product gas enters the heat exchanger 112 and the reactant gas exits the heat exchanger 112. In certain embodiments, the approach temperature is less than about 200° C., less than about 150° C., or less than about 100° C. In one embodiment, lower approach temperatures are obtained by preheating the reactant gas before it enters the heat exchanger 112, using, for example, an additional heat exchanger or heater. In another embodiment, the approach temperature is modified by increasing or decreasing the number of heat exchanger blocks 124. The reactant gas temperature at the converter inlet 122 may be between about 80° C. (e.g., with zero preheating) and about 500° C. (e.g., using an external metallic heat exchanger).

Referring again to FIG. 1, after passing through the heat exchanger 112, the reactant gas enters the annular heating zone 114 defined by an inner cylindrical surface 130 of the insulation 120 and an outer cylindrical surface 132 of the reaction-chamber 116. The heating element 126 is placed within the annular heating zone 114 between the inner and outer cylindrical surfaces 130, 132. Upon entering the annular heating zone 114, the reactant gas travels over and directly contacts the heating element 126, which is connected to an external power source. While the depicted heating element 126 is a single cylindrical plate, alternative embodiments may use other shapes, such as rods, for the heating element, as long as the heat transfer area of the heating element 126 and gas flow rate in the annular heating zone 114 are high enough over the heating element(s) to allow operation of the heating element 126 at lower temperatures than previous systems (e.g., temperatures of about 1350° C. or less, versus 1600° C., or more, of previous systems). For example, a plurality of parallel rods may be placed within the annular heating zone 114 aligned substantially side-by-side in an annular conformation about the reaction chamber. In one embodiment, high gas velocities adjacent to these rods allow lower heating element temperatures, as described above, to be utilized.

Figure 5:
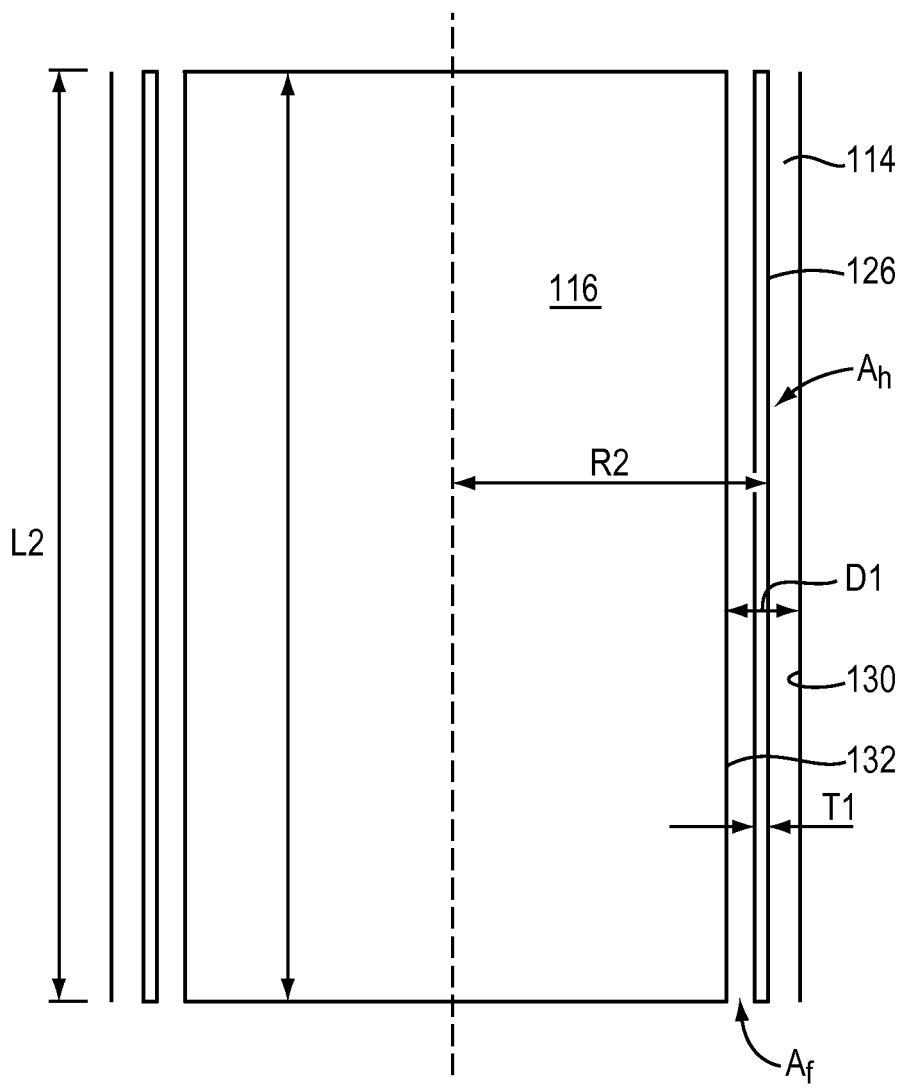
FIG. 5 is a schematic front view of an annular heating zone, according to an illustrative embodiment of the invention.
Figure 6:
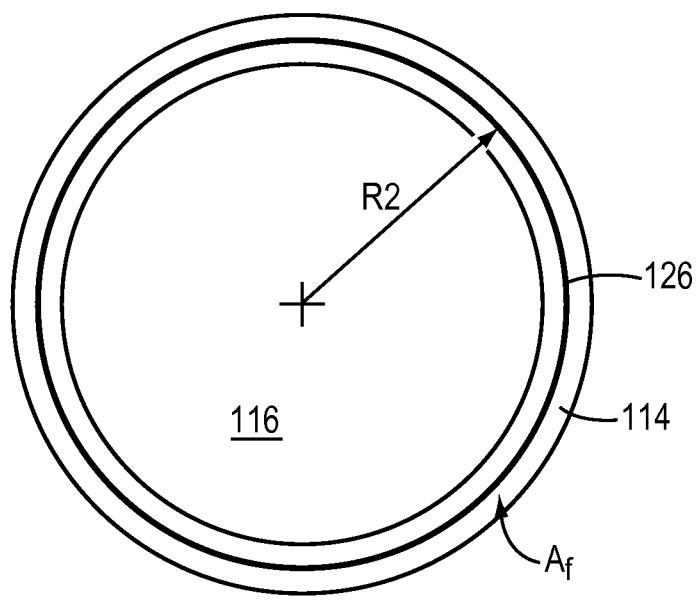
FIG. 6 is a schematic top view of an annular heating zone, according to an illustrative embodiment of the invention.
Figure 7:
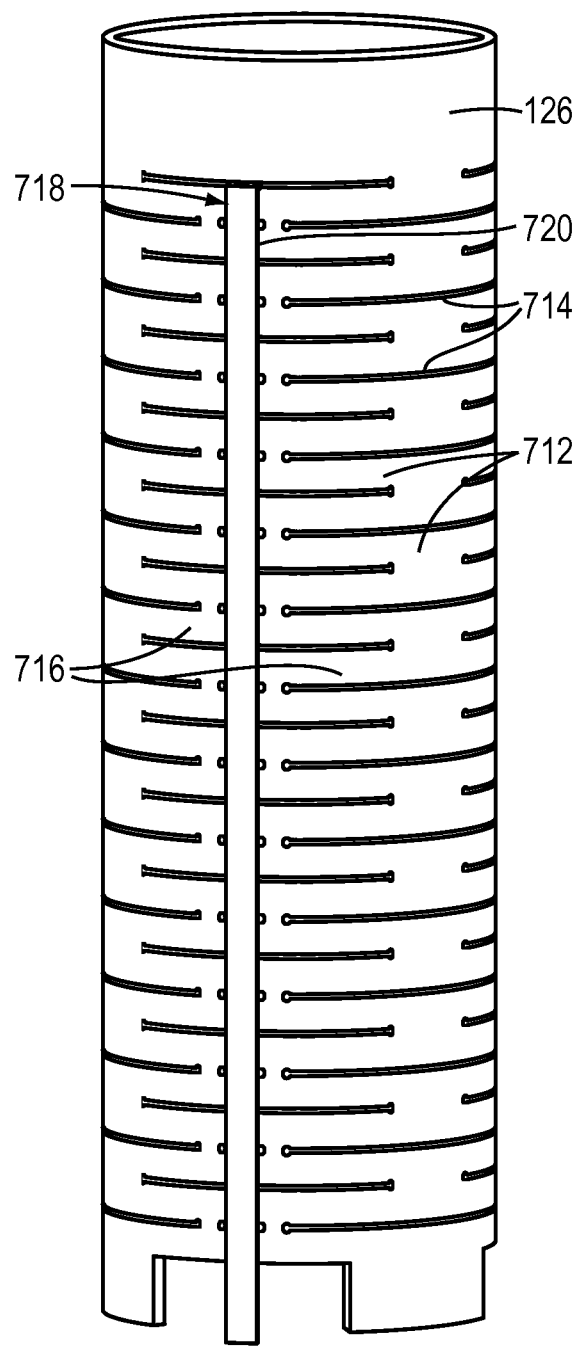
FIG. 7 is a schematic, isometric view of a heating element, according to an illustrative embodiment of the invention.

FIGS. 5 and 6 are schematic front and top views, respectively, of the annular heating zone 114 and the heating element 126, in accordance with an embodiment of the invention. As depicted, the heating element 126 has an annular conformation about the reaction chamber 116. In one embodiment, the heating element 126, the inner cylindrical surface 130, and the outer cylindrical surface 132 are concentric (i.e., their central axes are aligned). In certain embodiments, an axial length L2 of the heating element 126 is between about 1 meter and about 3 meters. In certain embodiment, a radius R2 of the heating element 126 is between about 0.25 meters and about 0.5 meters. In certain embodiments, a radial thickness T1 of the heating element 126 is between about 5 mm and about 20 mm.

In certain embodiments, the heating element 126 is made of a carbon/carbon composite material and includes a coating. The coating may include, for example, silicon carbide (SiC), zirconium carbide (ZrC), hafnium carbide (HfC), tantalum carbide (TaC), titanium carbide (TiC), niobium carbide (NbC), hafnium oxide (HfO$_2$), silicon oxide (SiO$_2$), zirconium oxide (ZrO$_2$), tantalum oxide (Ta$_2$O$_5$), yttrium oxide (Y$_2$O$_3$), titanium oxide (TiO$_2$), and/or aluminum oxide (Al$_2$O$_3$).

In certain embodiments, a cross-sectional area $A_f$ available for flow within the annular heating zone 114 is defined by a radial distance D1 between the inner and outer cylindrical surfaces 130, 132. In one embodiment, the radial distance D1 is from about 30 mm to about 80 mm. Due to a large ratio between the heating element radius R2 and the radial distance D1, the cross-sectional area $A_f$ available for flow is approximately $A_f = 2\pi R2$ D1. In addition, due to a small radial thickness T1 of the heating element 126, a heat transfer area $A_h$ of the heating element 126 (including inner and outer surfaces of the heating element) is approximately $A_h = 4\pi R2$ L2. In certain embodiments, therefore, a ratio Y of the heat transfer area $A_h$ to the cross-sectional area $A_f$ available for flow is approximately Y=2 L2/D1. In certain embodiments, depending on the values chosen for axial length L2 and radial distance D1, the ratio Y is from about 50 to about 100.

In one embodiment, central axes of the heating element 126, the inner cylindrical surface 130, and the outer cylindrical surface 132 are aligned and collinear. In another embodiment, the heating element 126 is not centered within the annular heating zone 114. For example, a distance between the heating element 126 and the inner cylindrical surface 130 may be different than a distance between the heating element 126 and the outer cylindrical surface 132.

In certain embodiments, an average velocity of the reactant gas within the annular heating zone 114 is between about 10 m/s and about 40 m/s. In one embodiment, an average mass flux of the reactant gas through the cross-sectional area $A_f$ available for flow is between about 30 kg/(m$^2$-s) and about 150 kg/(m$^2$-s). In another embodiment, the average mass flux of the reactant gas through the cross-sectional area $A_f$ available for flow is between about 70 kg/(m$^2$-s) and about 110 kg/(m$^2$-s). In certain embodiments, a residence time for the reactant gas in the annular heating zone 114 is between about 0.1 seconds and about 0.4 seconds.

In certain embodiments, a heat transfer rate Q between the heating element 126 and the reactant gas is between about 1300 kW and about 3500 kW. The heat transfer rate Q may be expressed as $Q = h A_h \Delta T$, where h is a heat transfer coefficient, $A_h$ is the heat transfer area of the heating element 126 (including inner and outer surfaces of the heating element), and $\Delta T$ is a difference between a heating element temperature and an average temperature of the reactant gas in the heating zone 114. In certain embodiments, the heat transfer coefficient h is between about 1000 W/(m$^2$-K) and about 3500 W/(m$^2$-K), or between about 1500 W/(m$^2$-K) and about 3000 W/(m$^2$-K). In one embodiment, a temperature of the heating element 126 is less than about 1200° C. In another embodiment, a temperature of the heating element 126 is between about 950° C. and about 1350° C., or between about 1150° C. and about 1250° C. While not wishing to be bound by a particular theory, it is believed that the heating element 126 heats the opposing surfaces (e.g., by radiative heat transfer) within the annular heating zone 114 (i.e., the outer surface of the reaction chamber 116 and the inner surface of the insulation 120) and that the heating element 126 is cooled by the reactant gas flow.

In another embodiment, the annular heating zone 114 is designed to promote turbulent flow of the reactant gas over the heating element 126. For example, the annular heating zone 114 may include turbulence promoters, such as baffles, dimples, and other structures or devices, to promote turbulence and thereby increase heat transfer to the reactant gas.

In certain embodiments, as a result of the heat transfer within the annular heating zone 114, a temperature of the reactant gas increases within the heating zone 114 by greater than about 100° C., greater than about 150° C., or greater than about 200° C. When the reactant gas exits the annular heating zone 114, a temperature of the reactant gas is above the temperature needed for an efficient hydrogenation reaction to occur (e.g., greater than about 900° C.).

In certain embodiments, the heating element 126 is an electrical heater, such as a three-phase electrical heater. In the embodiment depicted in FIG. 1, the heating element 126 is electrically connected to a power supply through an electrical connector 134. In certain embodiments, the heating element 126 includes three electrodes and six to nine electrical connections. In one embodiment, the heating element 126 uses only three electrical connections coming in from a side of the converter 110. Due at least in part to the small number of electrical connections, the heating element 126 may be easily removed from the converter 110 and replaced. In one embodiment, unlike a retrofitted CVD reactor, the converter 110 does not require a base plate. In another embodiment, a shorter heater is utilized to achieve high heating element surface temperatures.

In certain embodiments, the power supply provides the heating element 126 with a voltage or current that is controlled to achieve a particular target value. For example, the voltage or current supplied to the heating element 126 may be regulated to achieve a desired heat transfer rate Q and/or a desired temperature of the reactant gas. A control system used to achieve the target value may employ feedback and/or feedforward algorithms. For example, the control system may have a microprocessor that receives an input signal from a sensor (e.g., a flow sensor and/or a temperature sensor) and adjusts the voltage or current to achieve the target value.

FIGS. 7 through 10 are schematic views of a mock-up of the heating element 126 in accordance with an embodiment of the invention. As depicted, the heating element 126 includes a plurality of serpentine electrical paths 712 defined by a plurality of circumferential slots 714. Alternatively, the serpentine paths 712 may be defined by slots running in the axial direction, or other directions. As a result of the serpentine paths 712, electricity must travel a greater distance when flowing from one axial end of the heating element 126 to an opposite axial end. The long flow path allows a high voltage and low current to be utilized. In certain embodiments, a current density within the heating element 126 is up to about 2 amps/mm$^2$.

Figure 11:
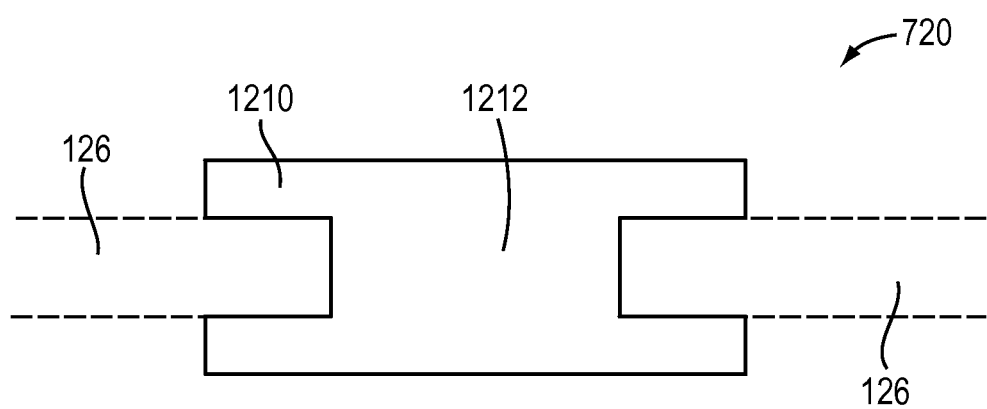
FIG. 11 is a schematic cross-sectional view of a stiffening element, according to an illustrative embodiment of the invention.

In the depicted embodiment, the heating element 126 is subdivided into three separate angular sections 716 (i.e., one section per phase of a three-phase heater) by axial slots 718 running along an axial direction of the heating element 126. In one embodiment, the axial slots 718 originate at an axial end of the heating element 126 but do not extend all the way through the heating element 126 to an opposite axial end. Instead, as depicted particularly in FIG. 9, the opposite axial end of the heating element 126 (i.e., without the axial slots 718) may act as a floating neutral (e.g., close to zero volts). In the depicted embodiment, to provide the heating element 126 with structural rigidity, a stiffening element 720 is placed within each axial slot 718. Referring to FIG. 11, in one embodiment, the stiffening element 720 has an H-shaped cross-section 1210. When installed in the heating element 126, a cross-member 1212 within the stiffening element 720 is inserted into the axial slots 718. The stiffening element 720 is made of a dielectric material, such as silicon nitride (SiN), alumina, quartz, and/or boron nitride.

In another embodiment, one or more circumferential belts or bands are wrapped around an outer perimeter of the heating element 126 and the stiffening elements 720. The belts or bands may confine or push the stiffening elements 720 in a radial direction, toward an axial center of the heating element 126, thereby maintaining a desired relative position between the stiffening elements 720 and the heating element 126.

Figure 8:
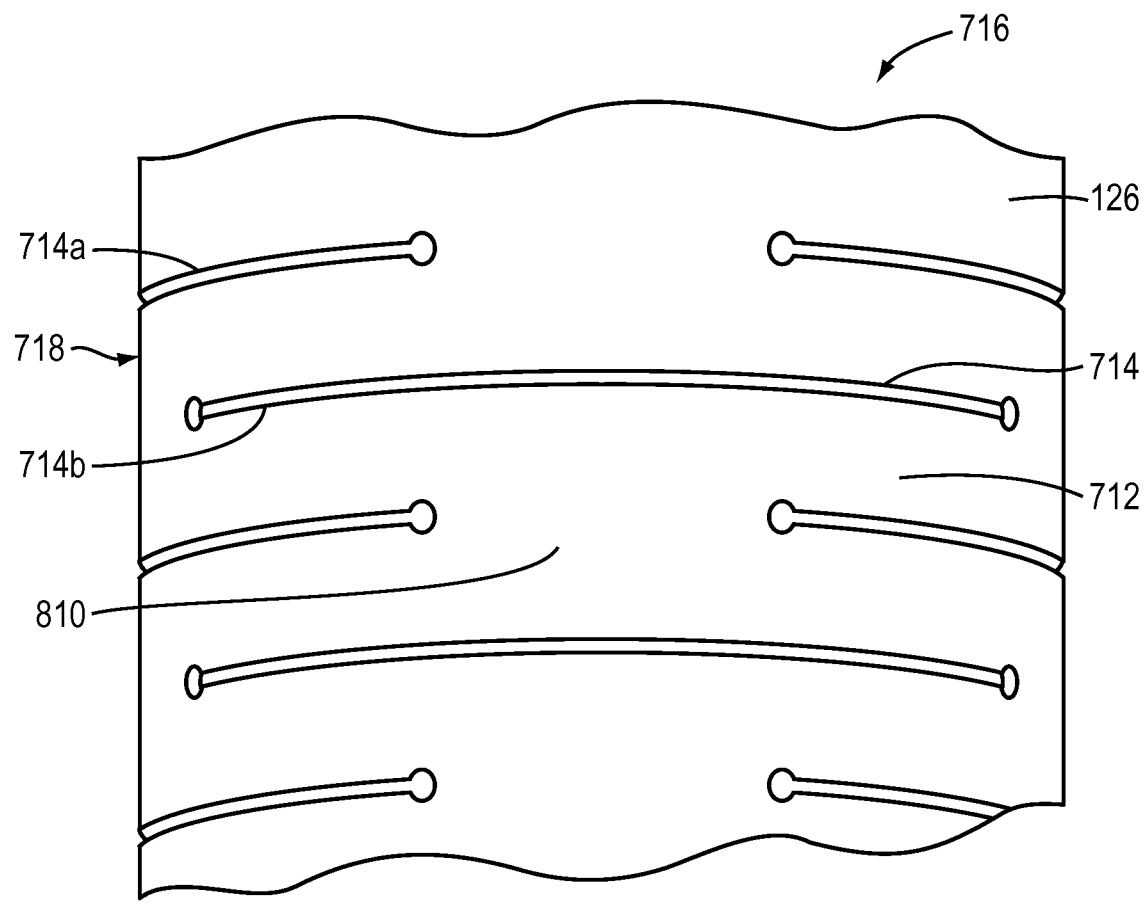
FIG. 8 is a schematic, isometric view of a portion of the heating element of FIG. 7, according to an illustrative embodiment of the invention.
Figure 9:
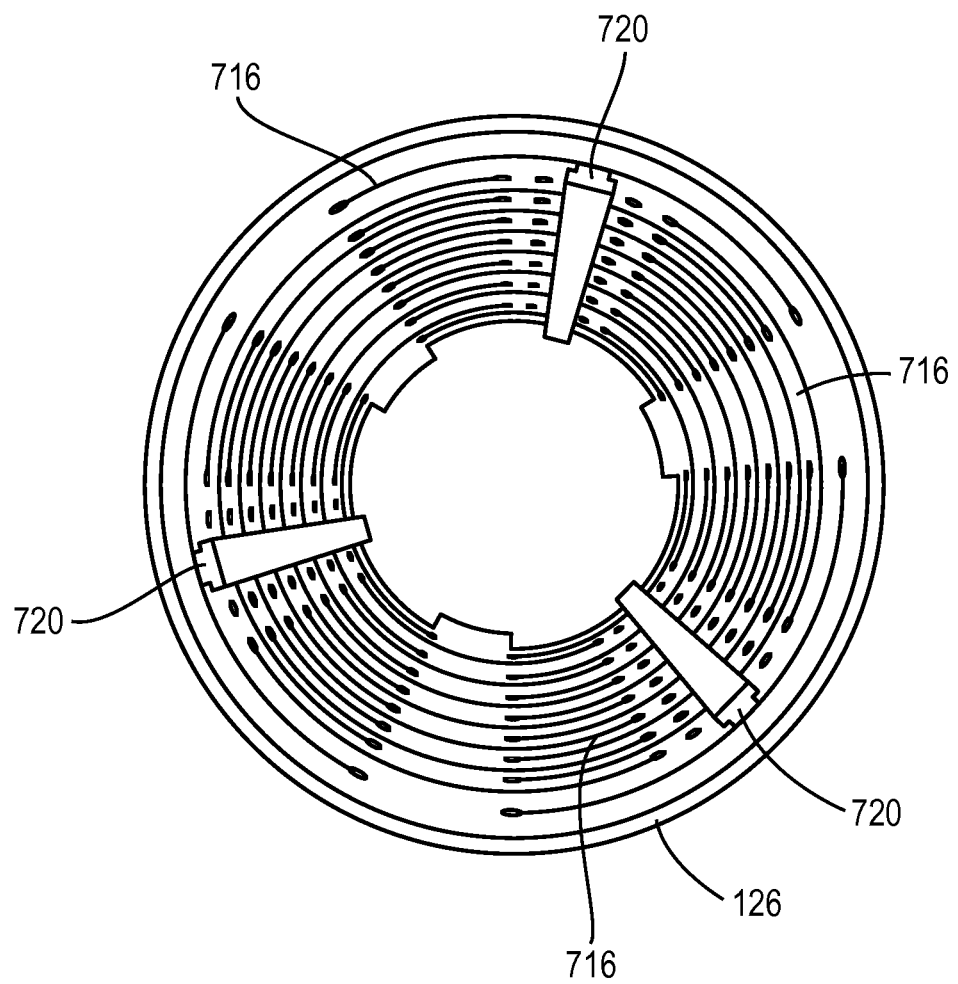
FIG. 9 is a schematic, perspective top view of a heating element, according to an illustrative embodiment of the invention.
Figure 10:
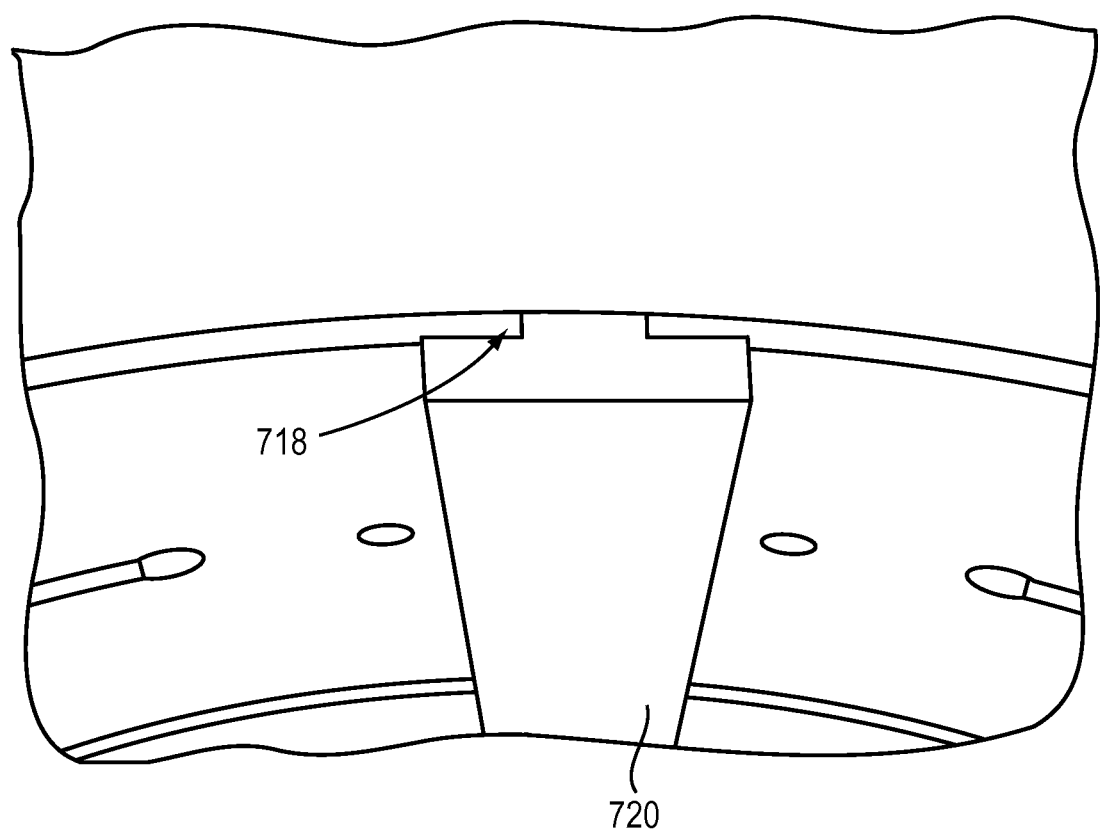
FIG. 10 is a schematic, perspective view of a stiffening element and a heating element, according to an illustrative embodiment of the invention.

Referring to FIG. 8, the circumferential slots 714 may include connected circumferential slots 714a, which are connected to an axial slot 718, and disconnected circumferential slots 714b, which are not connected to an axial slot 718. Within each angular section 716, the connected circumferential slots 714a are arranged in pairs, with the two slots approaching one another at a midsection 810 of the angular section 716. By contrast, the disconnected circumferential slots 714b are centered within the angular section 716 but do not span the distance between the two axial slots 718 on either side of the angular section 716. In the depicted embodiment, the connected circumferential slots 714a and disconnected circumferential slots 714b are arranged in an alternating pattern along the axial direction of the heating element 126. By alternating the slots 714a, 714b in this manner, the serpentine pattern 712 travels back and forth between the edges of the angular section 716 (i.e., near the axial slots 718) and the midsection 810, as it travels from one axial end of the heating element 126 to the opposite axial end. In one embodiment, the use of connected circumferential slots 714a and disconnected circumferential slots 714b results in a heating element 126 that is mechanically stiffer or more rigid than designs having different circumferential slot arrangements.

Figure 12:
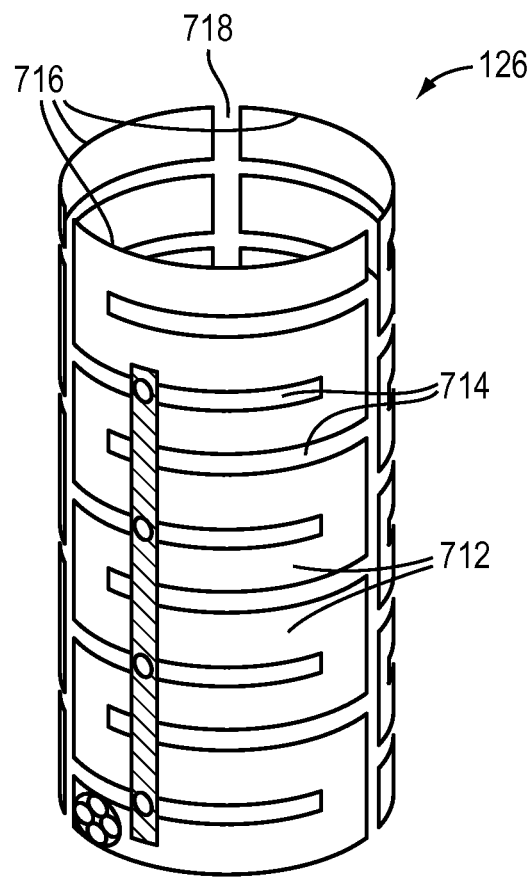
FIGS. 12 and 13 are schematic perspective views of a heating element, according to illustrative embodiments of the invention.

Referring to FIG. 12, in one embodiment, the serpentine pattern 712 within each angular section 716 is defined by circumferential slots 714 that originate, in an alternating manner, from the axial slots 718 on each side of the angular section 716. The resulting serpentine pattern winds back and forth between the axial slots 718 as it travels from one axial end of the heating element 126 to the opposite axial end.

Figure 13:
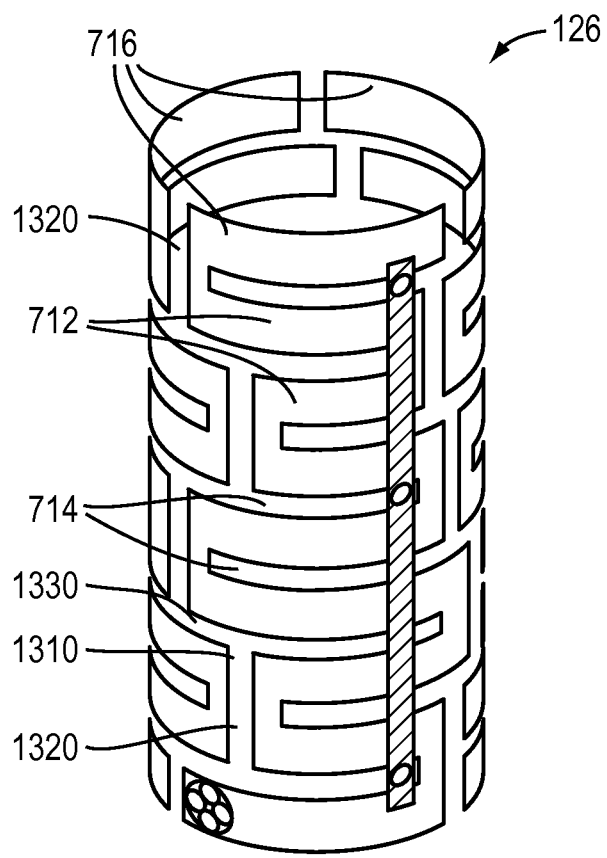

Referring to FIG. 13, the heating element 126 may be subdivided into angular sections 716 by serpentine slots 1310. The serpentine slots 1310 have axial portions 1320 that are aligned with an axial direction of the heating element 126, and circumferential portions 1330 that are aligned with a circumferential direction of the heating element 126.

Referring again to FIG. 1, after the reactant gas has been heated by the heating element 126 within the heating zone 114, the reactant gas enters the reaction chamber 116 where the hydrogenation reaction occurs. The reaction chamber 116 is a cylindrical tank that provides a sufficient residence time for the reactant gas to be converted into the product gas. In certain embodiments, a height of the reaction chamber 116 is between about 1 meter and about 3 meters. In another embodiment, a diameter of the reaction chamber 116 is between about 0.4 meters and about 1 meter. Flow conditions within the reaction chamber 116 may be plug flow.

In certain embodiments, the reaction chamber 116 is made of graphite and/or a carbon/carbon composite material. The reaction chamber 116 may include a coating of, for example, silicon carbide (SiC), zirconium carbide (ZrC), hafnium carbide (HfC), tantalum carbide (TaC), titanium carbide (TiC), niobium carbide (NbC), hafnium oxide ($HfO_2$), silicon oxide ($SiO_2$), zirconium oxide ($ZrO_2$), tantalum oxide ($Ta_2O_5$), yttrium oxide ($Y_2O_3$), titanium oxide ($TiO_2$), and/or aluminum oxide ($Al_2O_3$).

Once the hydrogenation reaction has occurred, the product gas enters the heat exchanger 112 where heat is transferred from the product gas to the incoming reactant gas. The product gas travels through the axial holes 212 in the heat exchanger blocks 124. Upon exiting the heat exchanger 112, the product gas exits the converter 110 through the converter outlet 128. In certain embodiments, the product gas temperature at the converter outlet 128 is between about 200° C. and about 625° C., depending on whether an external heat exchanger is utilized. For example, with no external heat exchanger, the product gas temperature at the converter outlet 128 may be between about 200° C. and about 350° C. By contrast, when an external heat exchanger is utilized, the product gas temperature at the converter outlet 128 may be as high as about 600° C.

Referring to FIG. 1, the pressure vessel 118 may be approximately cylindrical and include one or more vessel flanges 136 for securing two or more portions of the vessel 118 together. In certain embodiments, a diameter of the vessel 118 is between about 0.5 meters and about 1.5 meters. In certain embodiments, a height of the vessel 118 is between about 6 meters and about 12 meters. In another embodiment, the vessel 118 is made of a metal, such as carbon steel, and is water jacketed.

In certain embodiments, a pressure within the pressure vessel 118 is between about 5 bar and about 23 bar. In another embodiment, a pressure drop from the converter inlet 122 to the converter outlet 128 is about 2 bar.

The converter 110 has the capacities represented below and can be used for carrying out the conversion of STC to TCS in a polysilicon plant. In one embodiment, a feed rate for the reactant gas is between about 10,000 kg/hour and about 40,000 kg/hour, while converting 16-22% of the STC fed into TCS. This represents the highest capacity of all commercially available equipment and the lowest power consumption (0.5-0.8 kWh per kilogram of TCS manufactured).

In another aspect, the invention relates to a method for hydrogenation of a chlorosilane. The method includes the steps of: (i) introducing a reactant gas into a converter comprising a heat exchanger, a substantially annular heating zone, a heating element, and a reaction chamber, wherein the reactant gas comprises hydrogen and a chlorosilane; (ii) directing the reactant gas through the heat exchanger to exchange heat between the reactant gas and a product gas, thereby preheating the reactant gas; (iii) directing the preheated reactant gas from the heat exchanger into the substantially annular heating zone comprising the heating element, wherein the preheated reactant gas comes into direct contact with a surface of the heating element; (iv) directing the heated reactant gas from the substantially annular heating zone into the reaction chamber, wherein the heating element has an annular conformation about the reaction chamber; and (v) converting the heated reactant gas into the product gas within the reaction chamber.

In certain embodiments, the method is conducted such that a heat transfer coefficient between the heating element and the reactant gas is greater than about 1500 $W/(m^2$-K). An average mass flux rate of the reactant gas within the annular heating zone may be greater than about 65 $kg/(m^2$-s). In one embodiment, the heating element has an average surface temperature of about 1200° C. or less, and the heating element heats the gas to a terminal reaction temperature of about 900° C. or greater. In another embodiment, the reactant gas is introduced into the converter at a flow rate between about 10,000 kg/hour and about 40,000 kg/hour. In still another embodiment, the heated reactant gas is directed into the reaction chamber such that there is an average residence time within the reaction chamber of less than about 0.5 seconds.

In certain embodiments, the preheated reactant gas is directed into the annular heating zone such that there is an average residence time within the annular heating zone of less than about 0.2 seconds. The reactant gas may be heated to a terminal temperature before entering the reaction chamber. In one embodiment, at least a portion of the heat exchanger that operates at less than about 700° C. includes a silicon carbide (SiC) coating. A fluid flow within the reaction chamber may be plug flow. The reaction chamber may have a pressure between about 5 bar and about 23 bar. A pressure difference between a converter inlet and a converter outlet may be less than about 2 bar. In another embodiment, the chlorosilane includes silicon tetrachloride (STC) and the product gas comprises trichlorosilane (TCS).

Figure 14:
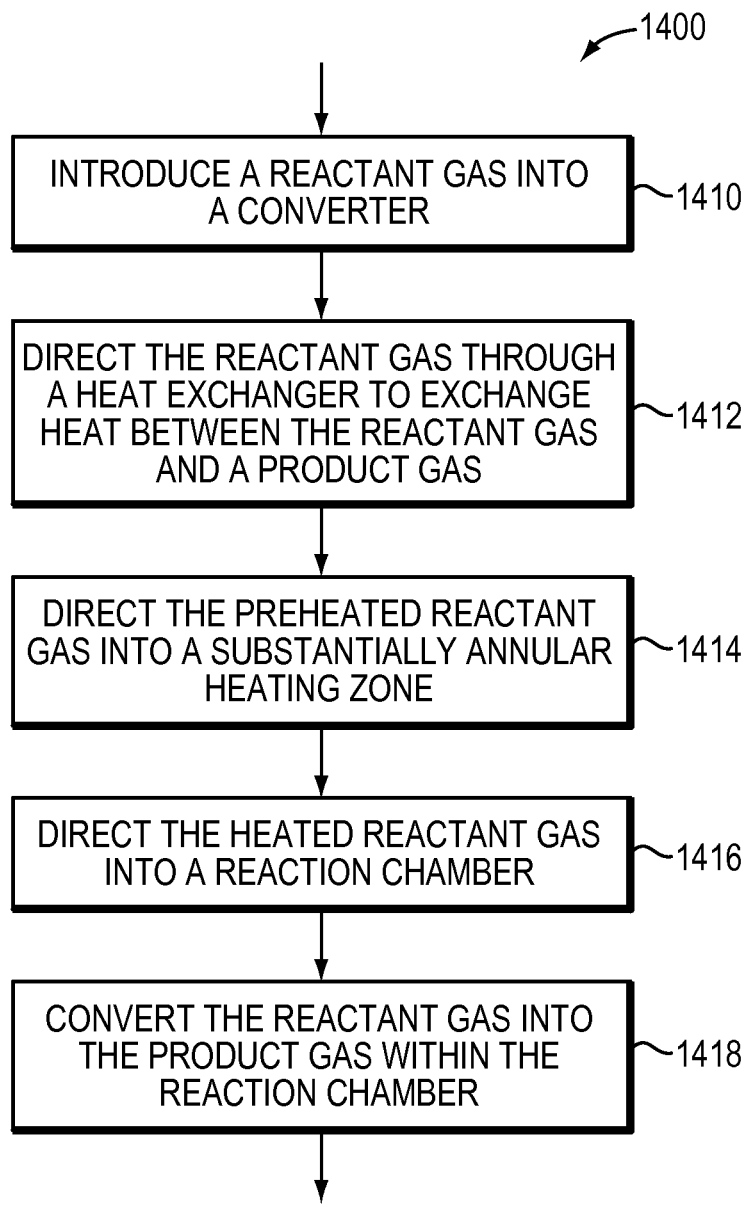
FIG. 14 is a flowchart of a method for hydrogenation of a chlorosilane, according to an illustrative embodiment of the invention.

FIG. 14 is a flowchart of a method 1400 for hydrogenation of a chlorosilane, in accordance with an embodiment of the invention. The method includes introducing (step 1410) a reactant gas into a converter, wherein the reactant gas comprises hydrogen and a chlorosilane. The reactant gas is directed (step 1412) through a heat exchanger to exchange heat between the reactant gas and a product gas, thereby preheating the reactant gas. The preheated reactant gas from the heat exchanger is directed (step 1414) into a substantially annular heating zone that includes a heating element. The preheated reactant gas comes into direct contact with the heating element. The heated reactant gas is then directed (step 1416) from the substantially annular heating zone into a reaction chamber, wherein the heating element has an annular conformation about the reaction chamber. Within the reaction chamber, the heated reactant gas is converted (step 1418) into the product gas.

Constructive Examples

Numerical modeling techniques were used to simulate the fluid flow and heat transfer within the converter 110. The computational fluid dynamics (CFD) software used for the simulations was ANSYS FLUENT, provided by Ansys, Inc., of Canonsburg, Pa. Input parameters and results for the simulations are provided in Table 1, below.

TABLE 1

Input parameters and results for CFD simulations.
Gen 2 converter characteristics from Fluent simulations:

| Input summary | | | |
|---|---|---|---|
| Geometry | Details as available per design | | |
| | Divided upon common symetry | | |
| | Divided by exchanger blocks | | |
| Mesh size | Varies by location with in geometry | | |
| Physical properties gas | From DIPPR database | | |
| Physical properites solids | Published from Vendors | | |
| Pressure | barg | 6 | 22 |
| Flow | kg/hr | 19300 | 38300 |
| Mole ratio | H$_2$/STC | 2 | 2 |
| Heat density of heater element | kw/mt$^3$ | 56556 | 112232.9 |
| Interchanger | | | |
| U overall | w/mt$^2$-K | 413 | 700 |
| Hot gas outlet temperature | K | 1023 | 1023 |
| Pressure drop | Barg | 1.3 | 1.4 |
| Heater section | | | |
| Gas outlet Temperature | K | 1278 | 1280 |
| Heater average temperature | K | 1458 | 1565 |
| Heater maximum temperature | K | 1520 | 1625 |
| Heater minimum temperature | K | 1260 | 1294 |
| Film heat transfer coeficient | w/mt$^2$-K | 1567 | 2918 |
| Gas flux max | kg/mt$^2$-sec | 34.9 | 142.5 |
| Gas flux min | kg/mt$^2$-sec | 66.6 | 84 |
| Pressure drop | Barg | 0.06 | 0.072 |

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An apparatus for hydrogenation of a chlorosilane, the apparatus comprising:
   a source of reactant gas comprising hydrogen and a chlorosilane;
   a heat exchanger configured to exchange heat between the reactant gas and a product gas;
   an annular heating zone configured to receive the reactant gas from the heat exchanger, the heating zone comprising a heating element configured for direct contact with the reactant gas to produce a heated reactant gas via convective heat transfer;
   thermal insulation surrounding the annular heating zone; and
   a reaction chamber configured to receive the heated reactant gas from the annular heating zone and to convert the heated reactant gas into the product gas,
   wherein the annular heating zone lies between the insulation and the reaction zone and is defined by an inner cylindrical surface of the insulation and an outer cylindrical surface of the reaction chamber, and the heating element has an annular conformation about the reaction chamber.

2. The apparatus of claim 1, wherein the apparatus comprises a vessel housing the heat exchanger, the annular heating zone, and the reaction chamber.

3. The apparatus of claim 2, wherein the insulation is between the annular heating zone and a wall of the vessel, and wherein the apparatus further comprises insulation between the heat exchanger and the wall of the vessel.

4. The apparatus of claim 1, wherein a ratio of a heat transfer area of the heating element to a cross-sectional area available for flow through the annular heating zone is greater than about 50.

5. The apparatus of claim 1, wherein the heat exchanger comprises a plurality of heat exchanger blocks.

6. The apparatus of claim 5, wherein each heat exchanger block is coated with silicon carbide (SiC), zirconium carbide (ZrC), hafnium carbide (HfC), tantalum carbide (TaC), titanium carbide (TiC), niobium carbide (NbC), hafnium oxide (HfO$_2$), silicon oxide (SiO$_2$), zirconium oxide (ZrO$_2$), tantalum oxide (Ta$_2$O$_5$), yttrium oxide (Y$_2$O$_3$), titanium oxide (TiO$_2$), aluminum oxide (Al$_2$O$_3$), or mixtures thereof.

7. The apparatus of claim 5, wherein each of the heat exchanger blocks comprises a plurality of passageways aligned with a radial direction and a plurality of passageways aligned with an axial direction.

8. The apparatus of claim 5, wherein the heat exchanger blocks are configured such that fluid flow through the heat exchanger creates pressure to secure the heat exchanger blocks together.

9. The apparatus of claim 1, wherein the reaction chamber has a height between about 0.5 meters and about five meters.

10. The apparatus of claim 1, wherein the reaction chamber has a diameter between about 0.1 meters and about 1 meter.

11. The apparatus of claim 1, wherein the heat exchanger and the heating element each comprise one of a carbon/carbon composite and graphite.

12. The apparatus of claim 1, wherein the heating element is configured to be removable.

13. The apparatus of claim 1, wherein the heating element comprises no more than three electrodes.

14. The apparatus of claim 1, wherein the chlorosilane comprises silicon tetrachloride (STC) and the product gas comprises trichlorosilane (TCS).

15. The apparatus of claim 1, wherein the heating element comprises a serpentine path.

16. The apparatus of claim 15, wherein the heating element comprises a stiffening element disposed within an axial slot, and wherein the stiffening element has an H-shaped cross-section.

17. The apparatus of claim 16, wherein the stiffening element comprises silicon nitride (SiN), alumina, quartz, boron nitride, or mixtures thereof.

18. The apparatus of claim 1, wherein the annular heating zone is configured to cause the reactant gas to flow through the annular heating zone without changing its direction of flow.

19. An apparatus for hydrogenation of a chlorosilane, the apparatus comprising:
   a source of reactant gas comprising hydrogen and a chlorosilane;
   a heat exchanger configured to exchange heat between the reactant gas and a product gas;
   an annular heating zone configured to receive the reactant gas from the heat exchanger, the heating zone comprising a heating element configured for direct contact with the reactant gas to produce a heated reactant gas via convective heat transfer;
   thermal insulation surrounding the annular heating zone; and
   a reaction chamber configured to receive the heated reactant gas from the annular heating zone and to convert the heated reactant gas into the product gas,
   wherein the annular heating zone lies between the insulation and the reaction zone and is defined by an inner cylindrical surface of the insulation and an outer cylindrical surface of the reaction chamber, and the heating element has an annular conformation about the reaction chamber, said reaction chamber having an internal volume that is greater than an internal volume of the annular heating zone.

20. The apparatus of claim 19, wherein a radial distance between inner and outer surfaces of the annular heating zone is less than diameter of the reaction zone.

* * * * *